Feb. 2, 1960 J. D. MENDEZ-LLAMOZAS 2,923,124
APPARATUS FOR TRANSFORMING ENERGY OF COMPRESSED GAS
INTO JET PULSES TO PROVIDE A PROPELLING FORCE
Filed Nov. 9, 1954 4 Sheets-Sheet 1
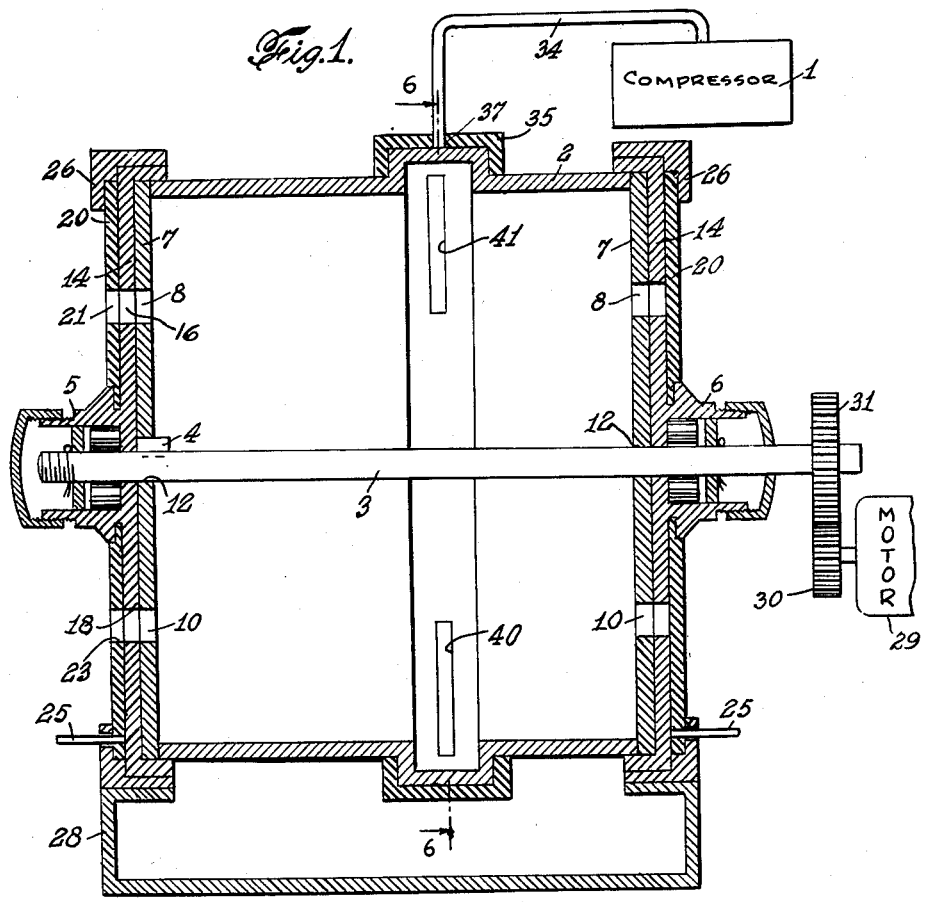
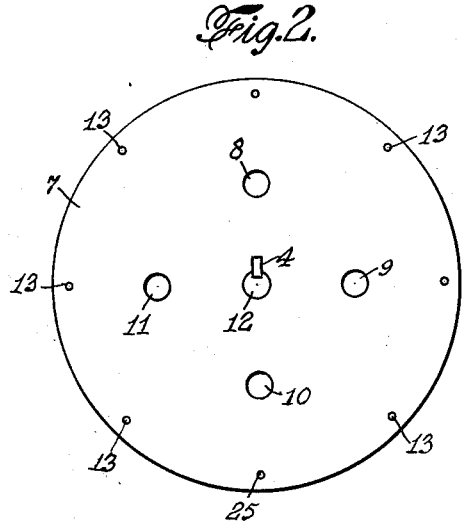
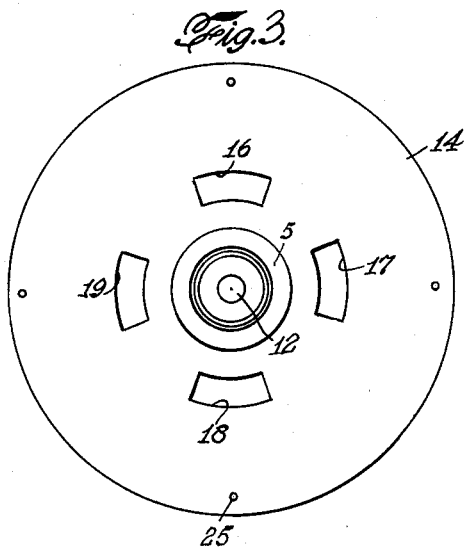

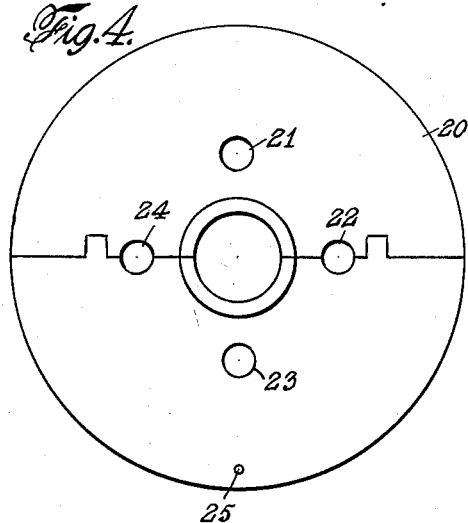
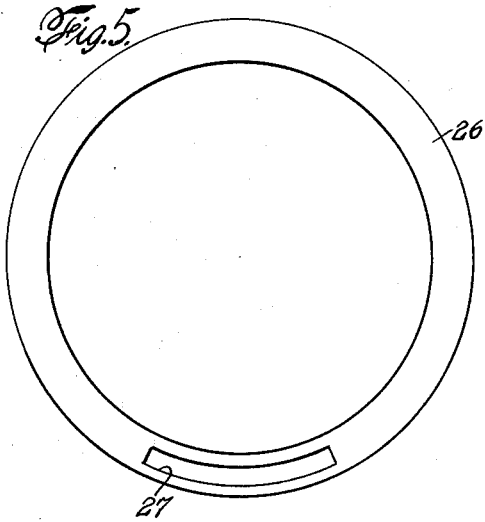
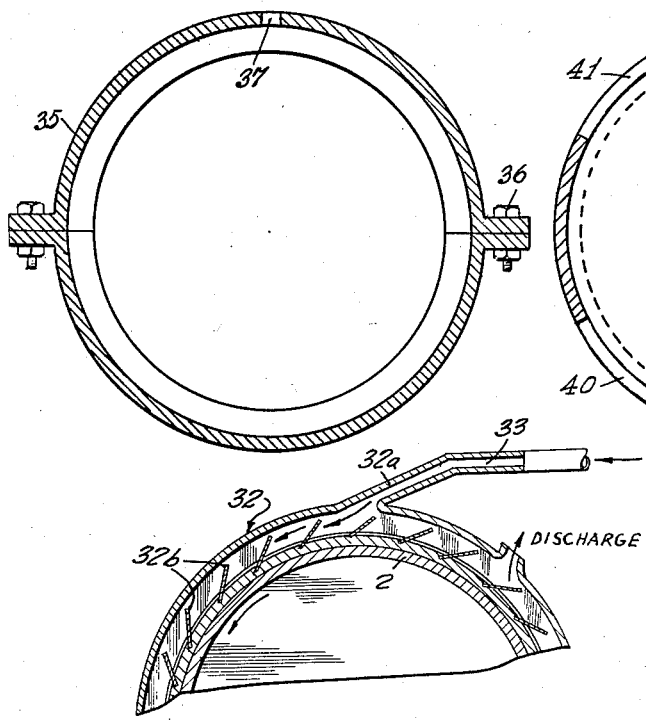
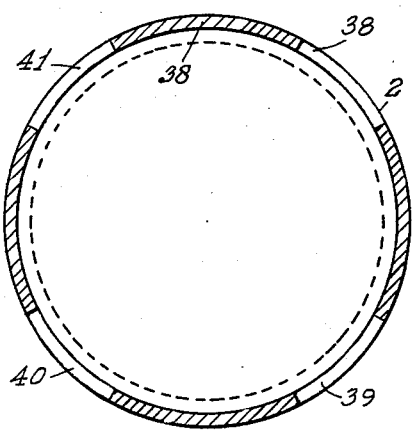

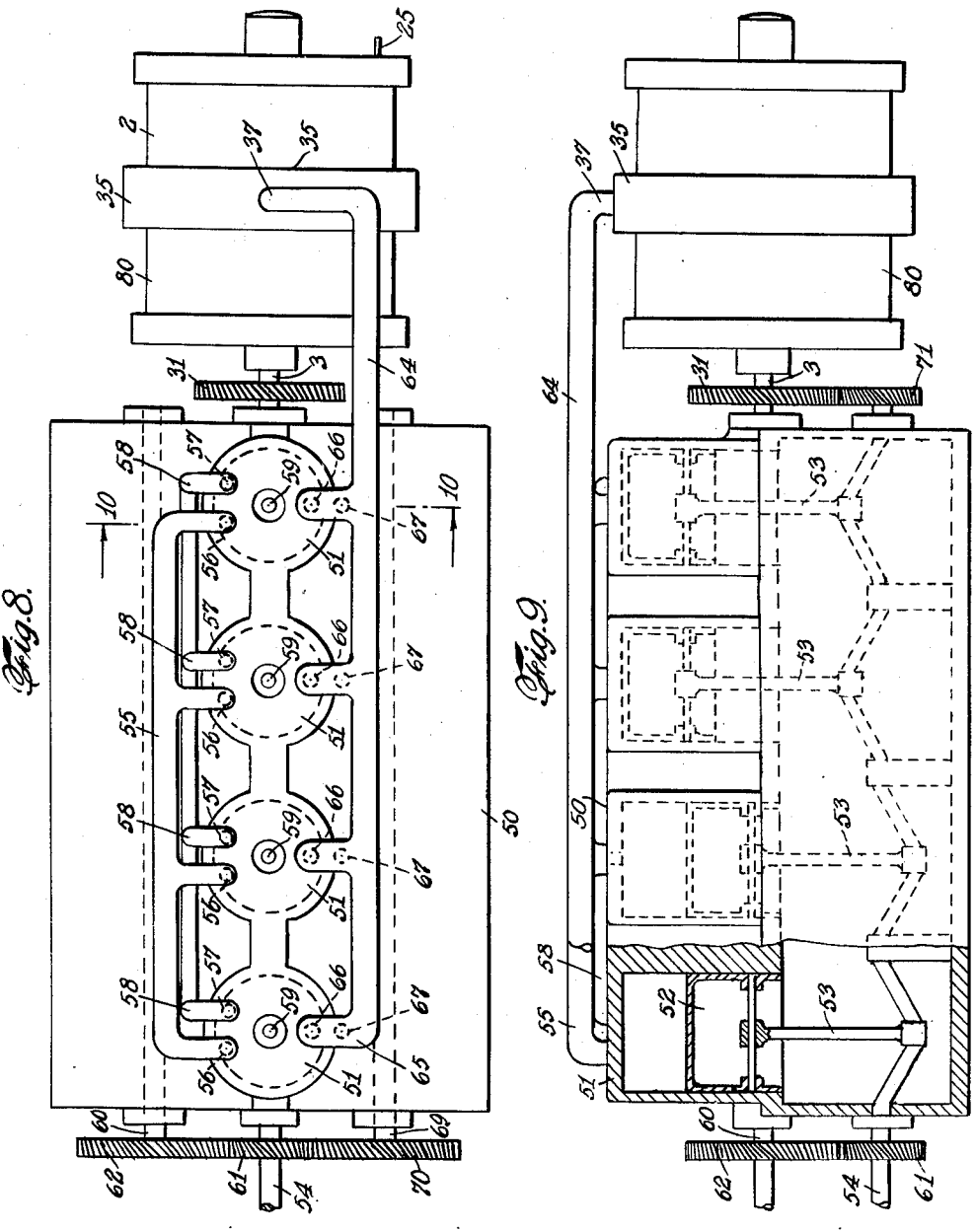

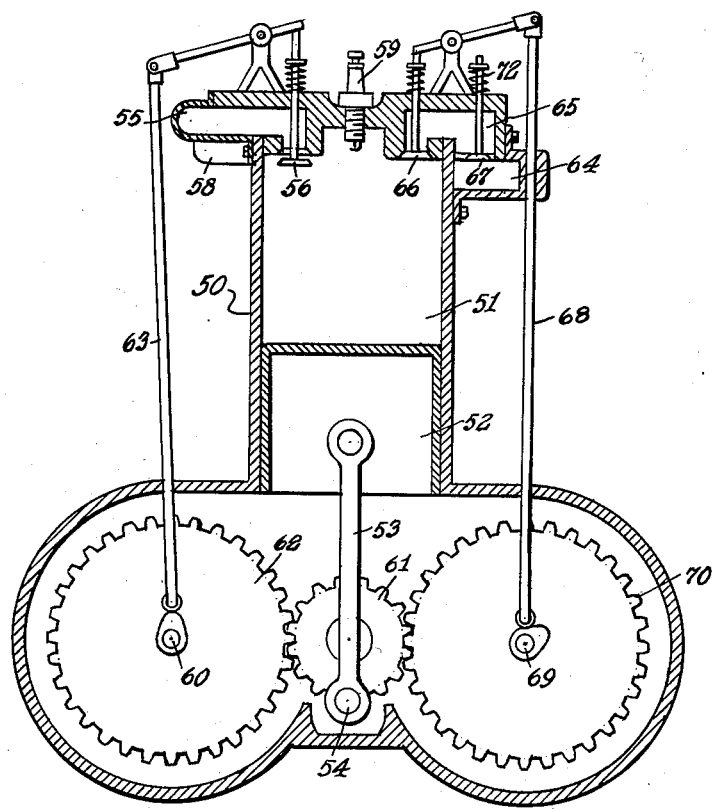

United States Patent Office
2,923,124
Patented Feb. 2, 1960

2,923,124

APPARATUS FOR TRANSFORMING ENERGY OF COMPRESSED GAS INTO JET PULSES TO PROVIDE A PROPELLING FORCE

Juan D. Mendez-Llamozas, Caracas, Venezuela

Application November 9, 1954, Serial No. 467,865

10 Claims. (Cl. 60—35.5)

The invention relates to jet propulsion apparatus and particularly to a device for transforming the energy of compressed gas into jet pulses to provide a propelling force that may be used for propelling vehicles or the like.

The present invention provides a jet motor for driving land, water or air craft or for exerting a propelling force for other uses. The motor may derive its required energy from any source of compressed fluid or gas such as a gas compressor or internal combustion energy.

An object of the invention is to provide a jet motor capable of efficient operation at low vehicle speeds.

Another object of the invention is to provide a jet motor which can be driven by an external power source such as a multi-cylinder internal combustion engine.

A further object of the invention is to provide a jet motor capable of being driven by an external gas compressor.

Another object of the invention is to enable an internal combustion engine to drive a vehicle without the necessity of a differential or a speed-changing transmission.

Another object of the invention is to enable an internal combustion engine to drive a vehicle at a velocity which is independent of the engine speed.

According to the invention, gas under pressure is supplied to a substantially closed chamber to charge the chamber to a high pressure, the chamber having ejection ports which are opened periodically to discharge the compressed gas from the chamber as jet pulses. The ports can be adjusted to produce a discharge in a desired direction or directions in order to control the direction of jet propulsion of the craft or vehicle. Means are also included for controlling the size of the ejection ports to enable them to be adjusted for maximum efficiency under any particular set of conditions. The chamber is preferably in the form of a drum, which may be rotated by a gas turbine, jet action, by the prime mover which drives the compressor, or by any other suitable means. The rotation of the drum controls the opening and closing of the compressed gas inlet and of the ejection ports so that the drum is alternately charged and discharged.

In a particular embodiment of the invention, the compressed gas is supplied by a conventional internal combustion engine. The engine is provided with a conduit connecting all its cylinders to the drum. Immediately after each explosion in a cylinder, a valve between that cylinder and the conduit is opened to permit the exploded gas to be conducted to the drum. The drum is driven by the engine so that the inlet to the drum opens synchronously with the valves and so that the ejection ports are opened after the exploded gas has entered the drum.

The foregoing objects and features, as well as the various other objects and features of the invention and its principles and mode of operation will be more fully understood from the following description and the accompanying drawing, in which:

Fig. 1 shows a view partly in cross section of one embodiment of the invention.

Fig. 2 is an end view looking axially of the drum 2 of Fig. 1 and showing one of the end plates 7.

Fig. 3 is a similar view showing one of the intermediate valve plates 14.

Fig. 4 is a similar view showing one of the outer valve plates 20.

Fig. 5 is a similar view showing one of the annular plates 26.

Fig. 6 is a cross section of the girdle 35 taken approximately on the line 6—6 of Fig. 1.

Fig. 7 is a cross section of the drum 2 taken approximately on the line 6—6 in Fig. 1.

Fig. 8 is a top view of another embodiment of the invention wherein an internal combustion engine is transformed into a jet motor.

Fig. 9 is a front view, partly in cross section, of the apparatus shown in Fig. 8.

Fig. 10 is a sectional view taken through one of the cylinders of the internal combustion engine; and Fig. 11 is a fragmentary cross section through the drum showing an alternative means for rotating the drum.

In Fig. 1 there is shown a reaction motor adapted to be driven by a source of compressed gas, such as the gas compressor 1. The motor includes a rotary drum 2 fixed on a shaft 3 by a key 4. The shaft 3 is mounted in end bearings 5 and 6. Drum 2 is provided with end plates 7. Each end plate 7 has four ejection ports 8–11 and a central hole 12 for receiving shaft 3 and key 4, as shown in Fig. 2. Plate 7 also is provided with a plurality of bolt or rivet holes 13 for fastening plate 7 to drum 2. Adjacent end plates 7, valve plates 14 and 20 are provided. Plate 14 is fixed and has four holes 16–19 (Fig. 3) adapted to register periodically with the ports 8–11 in plate 7, as the latter rotates. Plate 20 likewise has four holes 21–23 adapted to register with those in plates 7 and 14. Plate 20 is made of two halves to facilitate assembly, as shown in Fig. 4. Plate 20 is adjustably rotatable by means of handle 25 so as to regulate the effective size of the ejection ports or to close the ports entirely. Generally the ports will be opened at one end of the drum and closed at the other end. The handle 25 extends through a slot 27 in annular plate 26, as shown in Fig. 5. The motor is mounted on a suitable base 28 which may be an integral part of the craft or vehicle to be propelled.

The ejection or exhaust ports 8 of drum 2 are opened only for short intervals periodically, for reasons which will be explained more fully hereinafter. Any suitable valve means for opening the ejection ports may be used. In the present embodiment this is accomplished by rotating the drum 2 with respect to the valve plates 14 and 20. To this end a motor 29 may be coupled by a gear 30 to a gear 31 on shaft 3. Alternatively for the purpose of rotating drum 2, there may be provided a reaction motor 32 in the form of a gas turbine or jet motor which is shown in Fig. 11 as comprising a nozzle 32a and a series of buckets or blades 32b mounted on drum 2. The reaction motor 32 is supplied with gas under pressure, either through the drum or by conduit 33 connected to gas compressor 1, to rotate drum 2.

Drum 2 is surrounded by a fixed girdle 35, consisting of two halves fastened together by bolts 36, as shown in Fig. 6. A single inlet hole 37 provided at the top of girdle 35 is connected by a conduit 34 to the gas compressor 1. Inlet 37 cooperates with four inlet slots 38—41 in the drum. As drum 2 rotates, inlet 37 is opened four times during each revolution of drum 2, and drum 2 thus receives four charges of gas under pressure from compressor 1 through conduit 34.

The operation of the jet propulsion device shown in

Fig. 1 is as follows. Drum 2 is rotated at a suitable speed depending on the characteristics of compressor 1, the type of vehicle being propelled, the range of vehicle speed, etc. The rotation of the drum may be effected either by supplying compressed gas to reaction motor 32, or by driving shaft 3 through gear or wheel 31 by any suitable external driving means coupled thereto. The exhaust or ejection ports 21 are opened at one end of the drum and closed at the other end by rotating plates 20 by means of handles 25. The rotation of the drum causes the inlet 37 to the drum to open periodically and the drum thus receives a charge of gas from compressor 1, which raises the pressure in drum 2 to a predetermined value, depending on the angular length of the drum inlets 38—41, among other factors. Merely as an example of one suitable value, the inlets 38—41 may subtend angles of 36°. All exhaust ports are opened simultaneously after the inlet port is closed and, as the drum rotates, the exhaust ports are closed before the next opening of the inlet. Consequently four pulse jets are emitted simultaneously from one end of the drum and then the drum is recharged with compressed gas, and this cycle of events occurs four times during each revolution of the drum. The pulse jets produce a driving force against the closed end of the drum and therefore propel the craft in the direction of the closed end of the drum. If it is desired to reverse the direction of propulsion or to produce a braking effect, the exhaust or ejection ports 21—24 at the other (right) end of the drum are opened and the ejection ports on the left end of the drum are closed or partly closed.

Figs. 8–10 show how, according to the invention, an internal combustion engine may be adapted to produce jet propulsion. To avoid unnecessary complexity, many of the conventional components of an internal combustion engine are not shown and others are shown in simplified schematic form. Figs. 8 and 9 show an engine 50 having four cylinders 51 and pistons 52 therein. The pistons are connected by piston rods 53 to a crankshaft 54. An intake manifold 55 is connected to each cylinder through an intake valve 56. Each cylinder is also provided with the conventional exhaust valve 57, communicating with an exhaust conduit 58, and with a spark plug 59. The intake and exhaust valves 56, 57 are operated by a cam shaft 60 driven from crankshaft 54 through gears 61, 62. Valves 56 and 57 may be connected to cam shaft 60 by a suitable linkage 63, such as is illustrated schematically in Fig. 10.

The components of engine 50 described so far are conventional, but its mode of operation is changed basically by the following structure. Each cylinder 51 is connected to an explosion manifold 64 through a chamber 65 controlled by an explosion transmitting valve 66 and a check valve 67. The explosion valve is operated by a valve rod mechanism 68 actuated by a cam shaft 69 driven by the crankshaft through gears 61 and 70.

The power of engine 50 is transformed into pulse jet power by an apparatus 80 which is essentially the same as the apparatus shown in Fig. 1. The engine 50 constitutes the compressor 1 of Fig. 1. The rotatable shaft 3 of apparatus 80 is driven through gears 31 and 71 by crankshaft 54. Explosion manifold 64, which corresponds to the conduit 34 of Fig. 1, is connected to the inlet 37 of girdle 35, and thence to the drum 2. Since drum 2 is driven by crankshaft 54 through gears 71 and 31, the reaction motor 32 shown in Fig. 1 is not required, and consequently it is omitted in Figs. 8 and 9.

The operation of engine 50 is similar to that of a gasoline engine of the type used in automobiles, except that shortly after each explosion cam shaft 69 opens explosion valve 66. The pressure in chamber 65 then causes check valve 67 to open by overcoming the force of spring 72 which normally holds valve 67 closed. The opening of valve 67 permits the products of combustion under the pressure of the explosion to travel through the explosion manifold 64 to rotary drum 2 of jet propulsion apparatus 80. Drum 2 is rotated by engine 50. The inlet and ejection ports of drum 2 are arranged so that inlet 37 is opened during the time that an explosion is arriving at said inlet, and the inlet is closed immediately after the explosion has arrived thereat and long before the next explosion occurs. After inlet 37 is closed the ejection ports are opened, usually at one end only of the drum. Thereafter the ejection ports are closed again, this being done before the arrival of the next explosion. An explosion in any one cylinder not only opens the check valve 67 of that cylinder but, as will be readily understood, closes check valves 67 of all other cylinders and thus prevents the explosion from being dissipated or from interfering with the operation of the other cylinders. The explosions in engine 50 are thus converted into a series of pulse jets which causes the craft or vehicle to be propelled in one direction or the opposite direction, depending on the adjustment of the handles 25. It will be evident that means may be provided so that these handles may be controlled from a remote point if desired. The internal combustion engine is therefore capable of driving the vehicle without the customary "transmission" or differential and may be used for propelling craft of any type. Unlike the ram jet engines, the present motor can operate efficiently at low speeds. The invention enables internal combustion engines to be transformed into jet propulsion motors in a very simple manner and permits full utilization of the highly developed technology of gasoline engines.

While the invention has been illustrated and described with reference to only two particular embodiments thereof, it will be understood that these are intended only to illustrate the principles of the invention. Many variations and modifications of the apparatus disclosed herein can obviously be made and will be apparent to those skilled in the art. The true scope of the invention, therefore, is not limited, except as defined in the following claims.

What I claim and desire to secure by Letters Patent is:

1. A jet propulsion device comprising a substantially closed drum, means for rotating said drum, said drum having an opening in its circumference, a girdle having an inlet and surrounding said drum so as to close said opening except when the drum is in a first selected angular position to bring said opening into registry with said inlet, means for supplying compressed gas to said inlet whereby said gas is admitted to said drum when in said first selected position, said drum having ejection ports at at least one end thereof and a valve plate in juxtaposition to said drum end and having apertures coinciding with said ports to open said ports when said drum is in a second selected angular position and closing said ports when said drum is in said first angular position, compressed gas being thus admitted to charge said drum when in said first position and being discharged from said drum to provide a reactive propulsive force when the drum is in said second position.

2. A jet propulsion device according to claim 1 in which said means for supplying compressed gas comprises a gas compressor connected to the inlet of the girdle.

3. A jet propulsion device according to claim 1 wherein said drum has said ejection ports in the opposite end thereof and a valve plate in juxtaposition to said opposite end of the drum, said valve plate having apertures adapted to register with the ports during rotation of the drum.

4. A jet propulsion device according to claim 3, including a control plate positioned exteriorly adjacent the valve plate of the drum at each end thereof and means for adjusting the control plates to control the size of the passages of the valve plate openings.

5. A jet propulsion device according to claim 1 wherein in said means for driving the drum includes a compressed gas reaction motor and means for supplying gas under pressure to said motor.

6. A jet propulsion device according to claim 5 wherein said reaction motor is a turbine mounted on the circumference of the drum.

7. A jet propulsion device according to claim 1 wherein the means for supplying compressed gas includes an internal combustion engine having an explosion cylinder and a conduit connecting said cylinder to said inlet.

8. A jet propulsion device according to claim 7, wherein said engine comprises a plurality of explosion cylinders each including a valve, said conduit being connected to all cylinders through said valves, and a check valve between the conduit and each cylinder for preventing an explosion in one cylinder from entering the other cylinders.

9. A jet propulsion device according to claim 8 including a piston in each cylinder, a crankshaft connected to said pistons, a rotatable shaft connected to the drum, and means coupling said crankshaft to said rotatable shaft.

10. A jet propulsion device according to claim 8 wherein the explosions in the several cylinders occur sequentially and means for opening the first mentioned valve connected to each cylinder immediately after the explosion therein and closing said first valve before an explosion occurs in another cylinder.

References Cited in the file of this patent

UNITED STATES PATENTS

| | | |
|---|---|---|
| 309,009 | Thayer | Dec. 9, 1884 |
| 694,090 | Clayden | Feb. 25, 1902 |
| 1,983,191 | Price | Dec. 4, 1934 |
| 2,486,967 | Morrisson | Nov. 1, 1949 |

FOREIGN PATENTS

| | | |
|---|---|---|
| 943,820 | France | Oct. 11, 1948 |